(No Model.)
W. J. RENNIMAN.
VEHICLE BRAKE.
No. 339,931. Patented Apr. 13, 1886.
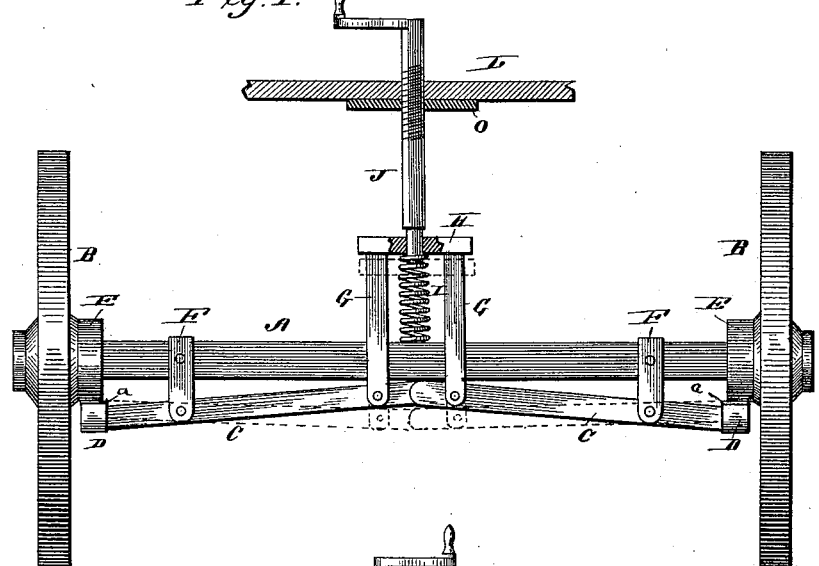
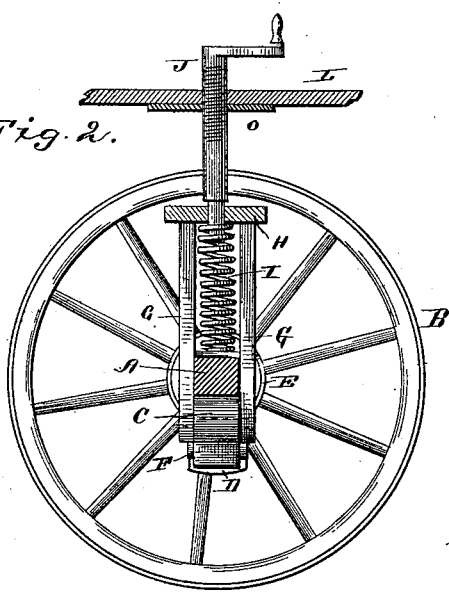
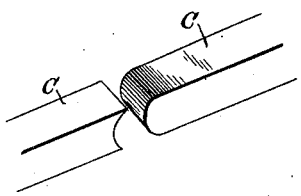
WITNESSES
INVENTOR
William J. Renniman
Per _____ Attorney

UNITED STATES PATENT OFFICE.

WILLIAM J. RENNIMAN, OF AVOCA, PENNSYLVANIA.

VEHICLE-BRAKE.

SPECIFICATION forming part of Letters Patent No. 339,931, dated April 13, 1886.

Application filed January 25, 1886. Serial No. 189,610. (No model.)

*To all whom it may concern:*

Be it known that I, WILLIAM J. RENNIMAN, a citizen of the United States, residing at Avoca, in the county of Luzerne and State of Pennsylvania, have invented certain new and useful Improvements in Vehicle-Brakes, of which the following is a specification, reference being had therein to the accompanying drawings.

This invention relates to improvements in vehicle-brakes, and it is especially adapted to be applied to that class known as "hacks" or "carriages," in which the driver is located in an elevated position, and therefore cannot conveniently operate a lever, as is usual with most of the ordinary brakes now in use. It is designed to produce a simple contrivance for the purpose that will be inexpensive and not mar the appearance of the vehicle, and be placed in such a position that it will not be readily liable to injury; and it consists in certain novel features of construction and combinations of parts, as will be more fully hereinafter described, and particularly pointed out in the claims. These objects I accomplish by the means illustrated in the accompanying drawings, in which—

Figure 1 represents a view of the front axle of a vehicle with my invention applied; Fig. 2, a vertical cross-sectional view of the same, and Fig. 3 a detail perspective of the end of the brake-lever.

In the drawings, A designates the axle, and B the wheels located on same.

C designates the brake-levers, which are provided on the outer ends with the brake-shoes D, which are arranged to bear upon metallic bands E, secured on the inner ends of the hubs of the wheels. These brake-levers are preferably pivoted underneath the axle to metallic supports or bearings F, located on the axle near the hubs. The inner end of one of these levers is convexed, so as to fit in a corresponding concavity in the inner end of the other lever, for the purpose of insuring an even and simultaneous movement of both the said bars.

Pivotally connected to the inner end of each of the brake-levers, one on each side of the axle, so as to be guided thereby, are two standards, G, which are secured to and support a perforated block, H. Between the block H and the axle is interposed a spring, I, the tendency of which is to elevate the inner ends of the brake-levers, thereby freeing the hubs of the brake-shoes.

Arranged to bear upon the block H, and thereby operate the brake-levers, is a vertical shaft, J, partially screw-threaded and provided with suitable operating means—such as the handle shown. This shaft may be passed up through the driver's platform L, so as to be within a convenient distance of the driver, and the platform may be provided on its under side with a metallic plate, O, with a screw-threaded aperture for the passage and support of the correspondingly screw-threaded operating-shaft. The lower end of this shaft is provided with a shouldered extension, which passes through the aperture in the block H, and serves to prevent displacement and allows of a movement of the vehicle-body when springs are used under the same.

To apply the brakes it is only necessary to operate the vertical shaft J, which communicates its motion by means of the standards G and block H to the brake-levers. When the operation of the shaft is reversed, the spring I will elevate the inner ends of the brake-levers, and thus release the hubs.

In order to prevent any unpleasant noise from arising by the brake-shoes bearing directly on the metallic bands on the hubs, an elastic or rubber pad may be secured to the said brake-shoes, as shown by *a* in the drawings.

Having thus fully described my invention, what I claim, and desire to secure by Letters Patent, is—

1. The combination, with suitable operating mechanism, of the brake-levers pivoted to the axle and provided with brake-shoes, one of said levers being rounded on its inner end, and adapted to fit in a corresponding concavity in the inner end of the other, substantially as and for the purpose described.

2. The combination, with the brake-levers pivoted to the axle, of the block H, connected to the inner ends of the brake-levers, and having interposed between it and the axle a spring, substantially as shown and described.

3. The combination, with the brake-levers pivoted to the axle, of the block pivotally connected to the inner ends of the said levers, the spring interposed between the block and the axle, and the vertical operating-shaft, substantially as specified.

4. The combination, with the brake-levers pivoted to the axle, of the perforated block pivotally connected to the said levers, interposed spring, and vertical screw-threaded operating-shaft having a shouldered extension projecting into the aperture in the block, substantially as specified.

5. The combination, with the operating-shaft, the block pivotally connected to the brake-levers, and the interposed spring, of the brake-levers pivoted under the axle and arranged to bear upon the rim of the hub, the inner end of one of the said levers being rounded to fit in a corresponding concavity in that of the other, substantially as specified.

In testimony whereof I affix my signature in presence of two witnesses.

WILLIAM J. RENNIMAN.

Witnesses:
CHAS. D. DAVIS,
JOHN C. JENKINS.